United States Patent [19]

Niedecker

[11] 4,306,334

[45] Dec. 22, 1981

[54] PROCESS AND APPARATUS FOR TREATING SAUSAGE CASING PRIOR TO FILLING

[76] Inventor: Herbert Niedecker, Am Ellerhang 6, D 6240 Konigstein 2, Fed. Rep. of Germany

[21] Appl. No.: 127,023

[22] Filed: Mar. 4, 1980

[30] Foreign Application Priority Data

Mar. 16, 1979 [DE] Fed. Rep. of Germany ....... 2910476

[51] Int. Cl.³ .............................................. A22C 13/00
[52] U.S. Cl. ......................................... 17/49; 17/42
[58] Field of Search .................. 17/41, 42, 49; 53/141

[56] References Cited

U.S. PATENT DOCUMENTS 3,594,856 7/1971 Michl ...................................... 17/42

*Primary Examiner*—Willie G. Abercrombie
*Attorney, Agent, or Firm*—Sprung, Felfe, Horn, Lynch & Kramer

[57] ABSTRACT

A rotatable holder has a plurality of parallel carriers onto which sausage casings are gathered. The holder rotates to dip the casings sequentially in a treating liquid after which the carriers and casings emerge. When a carrier is aligned with a filling tube of a sausage-filling machine, the casing is transferred still in gathered condition from said carrier to said tube. Means are provided to hold the casing in place and to facilitate start up of filling of a new casing.

18 Claims, 6 Drawing Figures

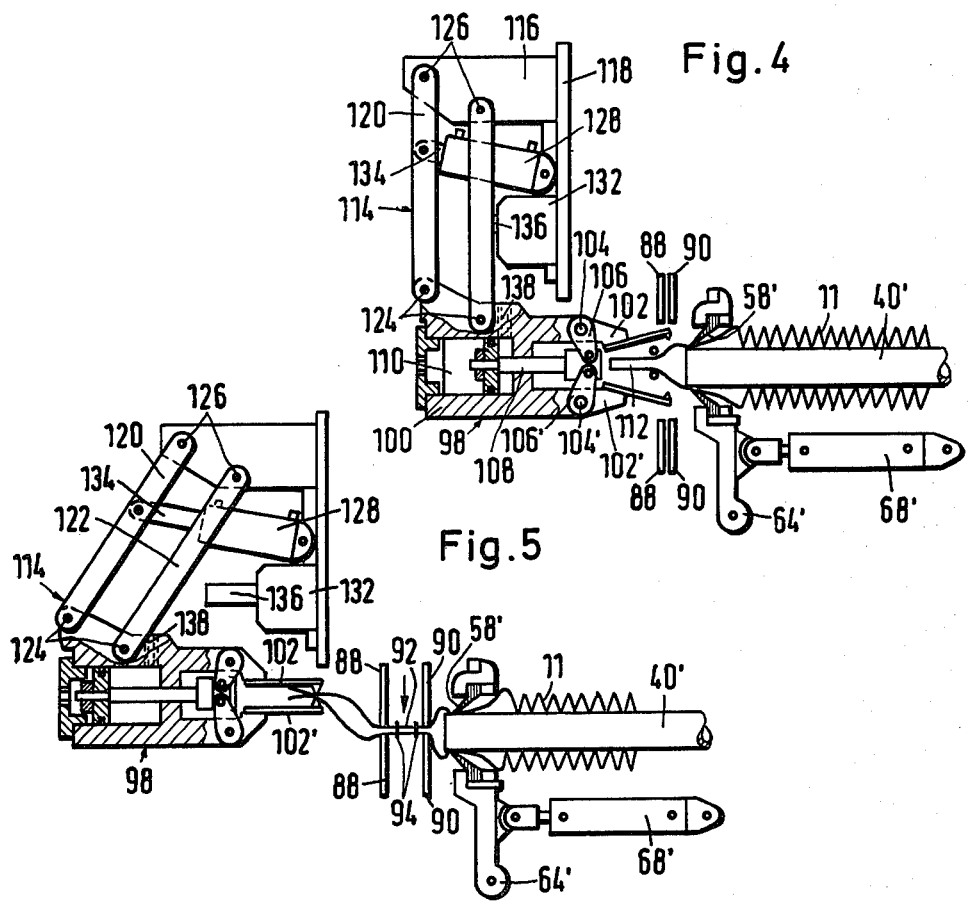
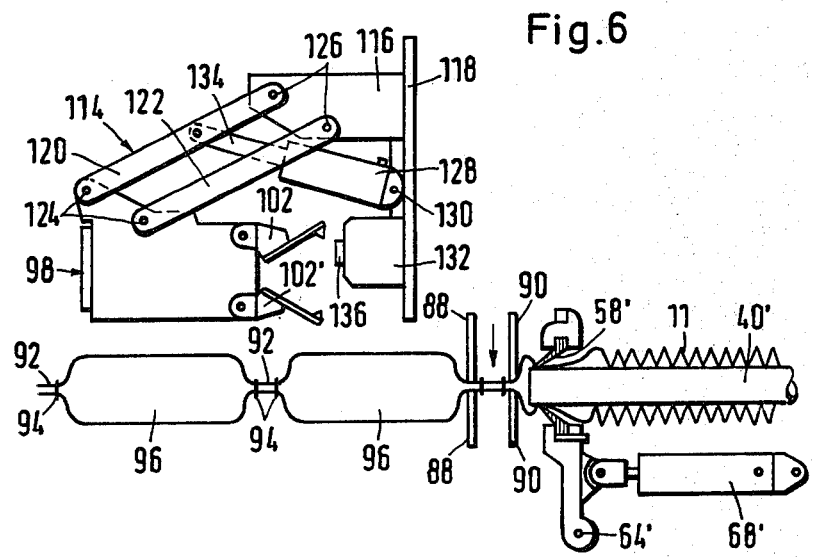

PROCESS AND APPARATUS FOR TREATING SAUSAGE CASING PRIOR TO FILLING

This invention relates to a process and apparatus for applying gathered artificial casings to be filled with pasty material to a filling tube of a filling machine, which cooperates with a closing machine, or to a filling tube of a turret, which is arranged before such filling machine and comprises a plurality of filling tubes.

Particularly in the packaging of sausage products it is known to gather artificial casings so as to form bellows and to draw them onto the filling tube of the filling machine. Successive portions of the artificial casing are then filled with the sausage meat and are thereafter cut off and subsequently closed by a closing machine.

Before the artificial casing is drawn onto the filling tube, it is necessary, as a rule, to pretreat the artificial casing so that it will be suitable for the subsequent filling and closing operations. That pretreatment consists in most cases of watering and may supplement a previous treatment imparted to the artificial casing, e.g., in the factory in which the artificial casing was made, for instance a treatment with glycerine or other chemicals. Watering is particularly necessary because in the dry state in which the artificial casing is delivered it is smaller in diameter than in a moist state. Unless it is watered, the dry artificial casing will expand when it has received the moist sausage meat and the resulting sausage will then soon slacken and assume a poor appearance.

The watering to which the artificial casing is subjected for this reason is often used also to rinse off chemicals, such as the above-mentioned glycerine, which have been added to the artificial casing, e.g., for preservation.

The previously used watering and moistening operations are relatively time-consuming and, above all, they are not reliably reproducible. In the known practice the gathered artificial sausage casings are placed for about 20 minutes in a water bath at about 40° C. It has been found that that temperature generally is not maintained throughout a workday because watering is effected mostly in simple water tubs. Besides, the water becomes enriched in the course of time with the preserving substances which have been washed off and leached. Any lubricant which may have been added to the artificial sausage casing will become contaminated unless it can be washed off. Any salt solutions which may be required for watering with a view to the composition of the material of the artificial casing will be subjected to fluctuations in concentration. By experience, the water tubs are often used to rinse implements which have been employed so that the artificial casings being watered are contacted by the sausage meat which has been washed off.

It is the object of the invention to provide a process and apparatus which are of the kind described first hereinbefore and in which a hygienically satisfactory and rapid pretreatment of artificial casings to be used for packaging foodstuffs are accomplished in such a manner that starting from the dry gathered artificial casing the feeding of the filling tubes with watered artificial casings and the subsequent operations until the packaging has been completed can be carried out virtually fully automatically.

In the process according to the invention this object is accomplished in that a gathered artificial casing is applied to a carrier, which together with the artificial casing is immersed into and kept in an aqueous fluid and the artificial casing is subsequently transferred to the filling tube.

In the process according to the invention the artificial casing is pretreated in step with the cyclic operation of the filling machine and after the artificial casing has been applied to the carrier, which is usually effected by hand. The artificial casing remains in the aqueous fluid consisting in most cases of water or wet steam at a temperature of about 70° C. for a time which is sufficient for an adequate watering so that the initially dry artificial casing is then suitable for processing on the filling machine. When the artificial casing has been watered, it is transferred to the filling tube.

A particularly satisfactory matching of the watering time of the artificial casings to the cyclic operation of the filling machine and the time required for the application of the artificial casings to the carriers will be permitted if, in accordance with another feature of the invention, a plurality of carriers for the gathered artificial casings are provided and an artificial casing is transferred from one of said carriers during the time in which the other carriers are receiving an artificial casing or are being immersed into or reside in the aqueous fluid.

It has been found that it is particularly desirable to control, in accordance with the invention, the transfer of the gathered and watered artificial casings to the filling tube by the closing machine and to operate the latter in synchronism with the filling machine.

The apparatus provided according to the invention for carrying out the process according to the invention is basically characterized in that it comprises watering means including one or more carriers for receiving the gathered artificial casings and transfer means for transferring the gathered and watered artificial casings from the carriers to the filling tube.

It will be particularly desirable to provide a plurality of carriers, each of which is mounted at one end on a holder, which revolves in the watering means.

According to a further feature of the invention the holder is star-shaped and rotatable on a horizontal axis and the transfer means comprise a horizontally displaceable pusher.

This basic arrangement permits a relatively simple structural design of the apparatus according to the invention. A watered synthetic casing will be transferred to the filling tube whenever the longitudinal axis of the respective carrier and the longitudinal axis of the respective filling tube are aligned with each other in the transfer position.

With a view to the desired automation of the packaging sequence, it is also contemplated according to the invention to associate a pivoted casing snubber with each filling tube in such a manner that the casing snubber associated with the filling tube which is in transfer position has been swung away from the filling tube and out of the path of the transfer means whereas the casing snubber which is associated with the filling tube that is in filling position has been swung to engage said filling tube.

A particularly compact arrangement of the watering and transfer means associated with a filling machine comprising a plurality of filling tubes carried by a turret will be obtained if, in accordance with the invention, the star-shaped holder is adapted to be driven to perform during each revolution a number of steps which is twice the number of carriers. With this design according to the invention the casing snubber can be most compactly arranged in the working range of the transfer means and of the carrier which is aligned with the filling tube to which the artificial casing is to be applied. This can be accomplished in such a manner that after the first step of a carrier the watered artificial casing carried by said carrier is applied to the filling tube aligned with said carrier and the empty carrier is subsequently moved out of the range of the filling tube in a second step so that the casing snubber can be swung to engage the filling tube.

The invention permits also of an improved automation of the sequence of packaging operations. For this reason, gripper tongs for gripping and pulling the leading end of the artificial casing are associated with the filling tube which is adjacent to the closing machine. Where such gripper is provided, the packaging material need not be handled with the human hand even at the beginning of a new packaging cycle in which a new artificial casing is used. This practice affords advantages regarding hygiene as well as the prevention of accidents. When it is desired to pull out the leading end of the watered artificial casing the operator need no longer reach through between the closing elements as far as to the filling tube. This manual operation might result in injuries to the hand in case of a failure of or damage to the control mechanism.

In accordance with the invention it is also proposed to control the gripper tongs throughout the watering, transfer and packaging sequence.

Further details, features and advantages of the invention will become apparent from the following description of a preferred embodiment, the claims and the diagrammatic drawing, in which:

FIG. 4 shows gripper tongs, which are provided on a closing machine. The latter is associated with the filling tube that is used for filling at a particular time. The gripper tongs are shown in a position shortly before gripping the leading end of the artificial casing.

FIG. 5 is a view which is similar to that of FIG. 4 and shows the gripper tongs swung out of the range of the closing members.

FIG. 6 is a view that is also similar to FIG. 4 and shows the gripper tongs swung also out of the path of the filled artificial casing.

Figure 1:
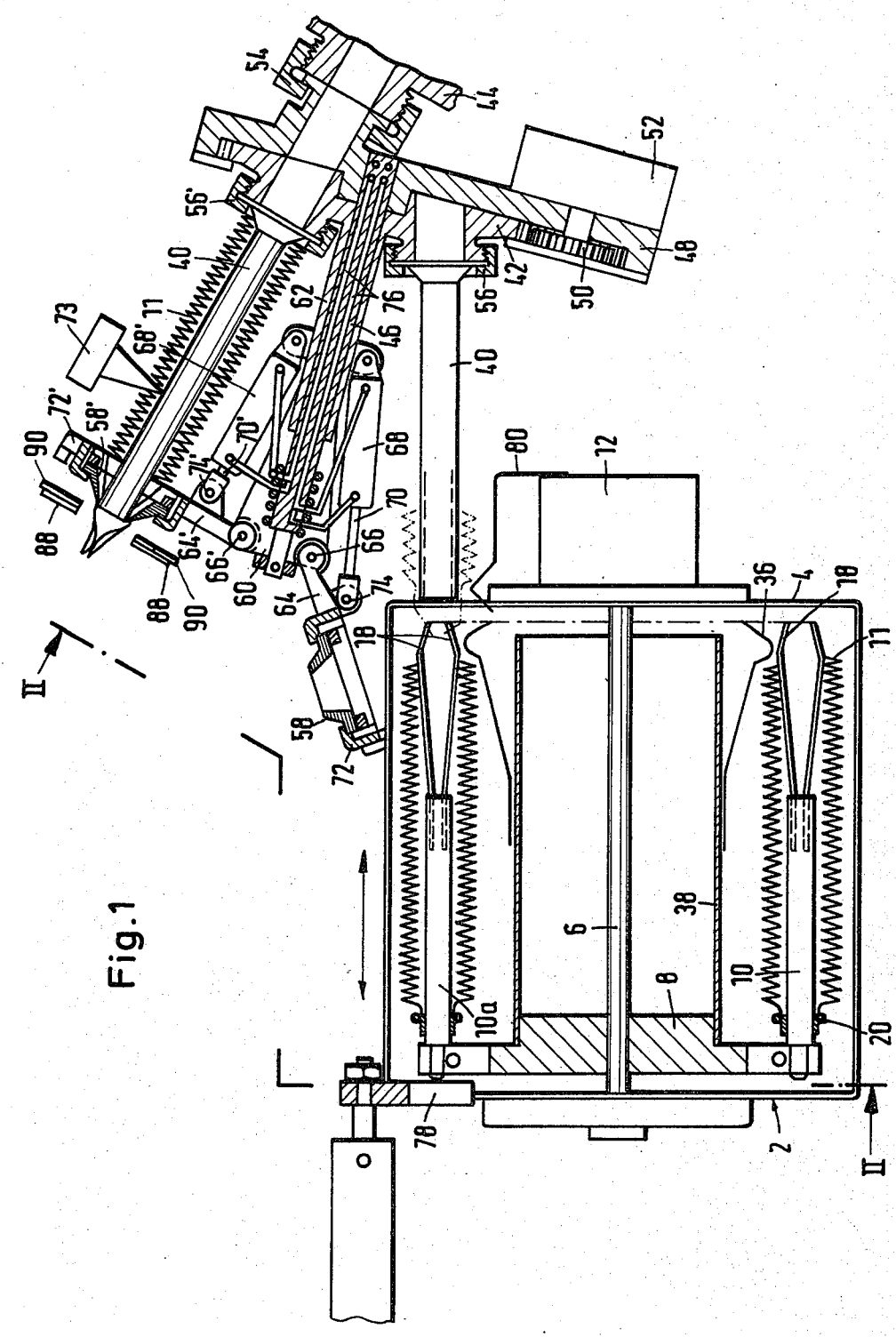
FIG. 1 is a longitudinal sectional view showing watering means and an associated filling tube turret of a filling machine, not shown in detail, for pasty material.

Watering means are generally designated 2 in FIG. 1 and comprise essentially a tub 4, which accommodates a shaft 6, which is rotatably mounted in the tub. A star-shaped holder 8 is carried by the shaft 6 and carries carriers 10 for artificial casings 11 to be watered. A stepping mechanism 12 is provided beside the tub 4 and operable to impart an intermittent movement to the shaft 6, the star-shaped holder 8 and the carriers 10. Six carriers 10 are provided in the present case, as is apparent from the drawing.

The tub 4 is substantially filled with an aqueous fluid, such as water, for watering artificial casings 11. The surface level of the bath is designated 14.

Figure 2:
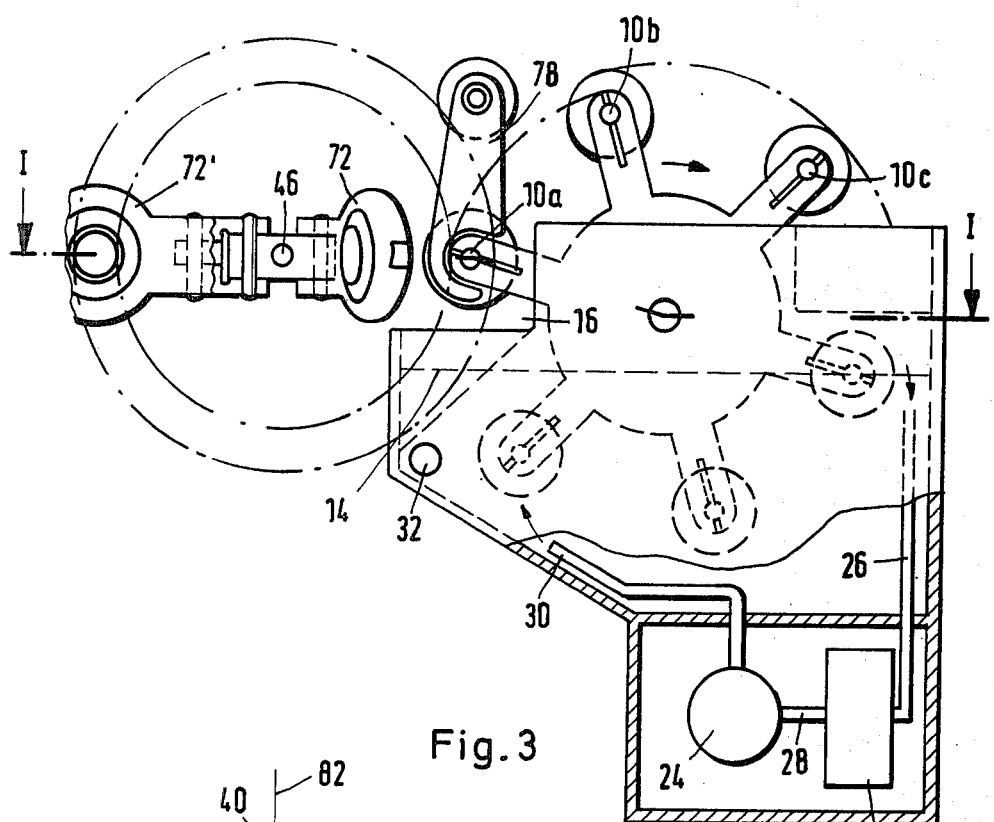
FIG. 2 is a sectional view taken on line II—II in FIG. 1 and shows a casing snubber which is disengaged from a filling tube of the filling tube turret, which filling tube is to be supplied with a watered artificial casing.
Figure 3:
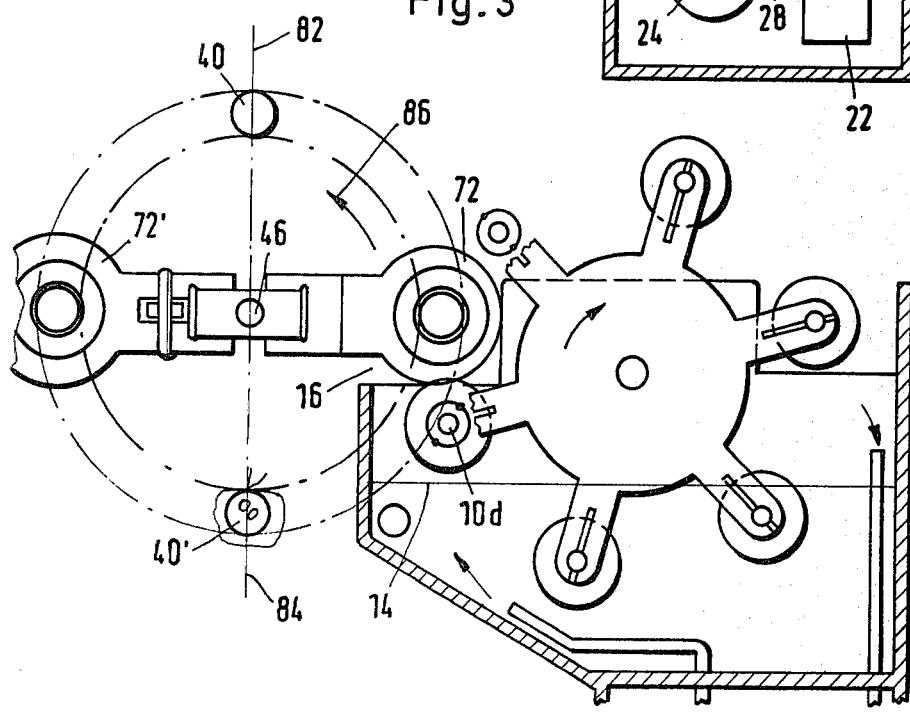
FIG. 3 is a view that is similar to FIG. 2 and shows the casing snubber which has been swung into engagement with the filling tube, to which a watered artificial casing has previously been applied.

As is apparent from FIGS. 2 and 3 the tub 4 is open at its upper edge and has in each side wall a rectangular aperture 16, which is used for the transfer of watered artificial casings 11 from the carrier 10a which is aligned at a given time with these apertures to a filling tube 40 of the filling machine 44. That transfer will be explained hereinafter.

In the embodiment shown in the drawing, a watered artificial casing 11 is transferred whenever a carrier 10a is aligned with a filling tube 40 of the filling machine 44, as has been mentioned. In FIGS. 1 and 2 this applies to the carrier 10a. Those carriers 10b and 10c which precede the carrier 10a in the direction of rotation protrude from the tub 4 of the watering means 2. Dry gathered artificial casings 11 which are to be watered can be conveniently applied by hand to the carriers which are in that position.

In order to ensure a reliable fit of these artificial casings 11 on the carriers 10, the latter are provided with a plurality of resilient tongues 18, shown in FIG. 1, which are biased outwardly so that they prevent a slipping of the dry gathered artificial casings 11 when the latter have been fitted on the carriers 10. At that end of the resilient tongues 18 which is nearer to the star-shaped holder 8, the artificial casing 11 which has been fitted to a carrier 10 may be held by means of a rubber ring 20. These rubber rings 20 may be replaced by an automatic mechanical clamping device, although this involves a higher expenditure.

The action of the resilient tongues 18 of the carriers 10 can be assisted by one or more additional springs 36, which are carried by a tube 38, which at one end is secured to the star-shaped holder 8. As is shown in the drawing the springs 36 define only relatively small clearances with the resilient tongues and thus assist the resilient tongues 18 in holding the artificial casings 11 against slipping from the carriers 10. The time of each revolution of the star-shaped holder and of each artificial casing 11 is selected so that the artificial casings 11 are sufficiently watered.

In this connection it may be mentioned that the tub 4 is provided with a filter 22 and a pump 24 for the aqueous fluid so that the same is continuously purified as it is circulated through the conduits 26, 28, 30. A thermostat-controlled heater 32 for the aqueous fluid is also incorporated for maintaining the desired temperature in the tub 4. A float switch may also be provided.

In addition to supporting the springs 36, the tube 38 affords the advantage that it restricts the freely accessible surface area of the water in the tub 4 and thus prevents an excessive soiling of such water.

It is apparent from FIGS. 1 and 2 that a filling tube 40 of a turret 42 of a filling machine 44 for pasty material is aligned with the carrier 10a, which is ready for the transfer of the watered artificial casing 11. The filling machine 44 is not shown in detail. The turret 42 carries a plurality of filling tubes 40, 40' and is pivoted on a pin 46, which is fixed in a baseplate 48. The turret 42 is driven about that pin 46 by a pinion 50, which meshes with mating teeth provided at the periphery of the turret 42. When the pinion 50 is driven by a stepping mechanism 52, a step-by-step movement is imparted to the turret so that after every other step of the holder 8 the filling tube 40 is fed in the position in which the filling tube 40 is aligned with a carrier 10a.

The baseplate 48 of the turret 42 is flanged to the filling machine 44 by a cap nut 54. The filling tubes 40 and 40' are flanged to the turret 42 by respective cap nuts 56 and 56'.

Two casing snubbers 58 and 58' are mounted on the pin 46 by means of a housing 60, which is fixedly connected to the turret 42 by a tube 62. As a result, the two casing snubbers 58, 58' rotate in synchronism with the turret 42. Each of the casing snubbers 58, 58' is linked to the housing 60 by a lever 64 or 64' and is pivoted to the housing by a pin 66 or 66'.

A pivotal movement is imparted to the casing snubbers 58, 58' by respective drive means 68, 68' consisting in the present case of pneumatic cylinders having reciprocating piston rods 70, 70', which are pivoted by respective pins 74, 74' to holders 72, 72' for the casing snubbers 58 and 58'. In this arrangement the piston rods 70, 70' can be advanced and retracted to impart to the casing snubbers 58, 58' a pivotal movement, e.g., from one position shown in FIG. 1 to the other position shown there. See also the holders 72, 72' for the casing snubbers shown in FIGS. 2 and 3. For a supply of pressure fluid to the working chambers of the drive means 68, 68', the pin 46 has bores 76 for supplying the working fluid.

The apparatus described thus far has the following mode of operation: The artificial casing carried by the carrier 10a as shown in FIG. 1 has already been watered by being moved through the tub 4 and is ready to be transferred to the filling tube 40 of the turret 42, which filling tube is aligned with the artificial casing 11. For this purpose the artificial casing 11 is pushed from the carrier 10a to the right onto the filling tube 40 by means of the forked pusher 78, which may also be pneumatically actuated, e.g., and overcomes the force of the resilient tongues 18 and of the spring 36. For this transfer, the force of an additional spring 80 is overcome, which is provided in the present case on the stepping mechanism 12. That spring 80 prevents a slipping of the watered artificial casing 11 from the filling tube 40 when the forked pusher 78 has returned to its initial position shown in FIG. 1.

The stepping mechanism 12 then advances the star-shaped holder 8 by one step so that the carrier 10a assumes a position midway between the position of the carriers 10a and 10b shown in FIG. 2. In that position, shown in FIG. 3, the casing snubber 58 can be pivoted to engage the filling tube 40. For this purpose the drive means 68 are operated with a proper timing. Thereafter the artificial casing 11 is held in position on the filling tube 40' by a similar operation of the casing snubber 58'.

It is mentioned here that the star-shaped holder 8 may obviously be provided with carriers in a number differing from six. It will easily be understood that in this case the number of steps performed by the stepping mechanism 12 must be twice the number of carriers 10.

In the next step the turret 42 together with the filling tubes 40 and 40' and the two casings snubbers 58, 58' is rotated through 90° so that the casing snubber holder 72 reaches the position 82 and the casing snubber holder 72' reaches the position 84 in FIG. 3. When the casing snubber holder 72' is in position 84, the remainder of the artificial casing 11 which was left on the filling tube 40' when the filling operation had been completed is thrown off. As the casing snubber holder 72' is rotated through 90° to position 84, the casing snubber holder 72' is also swung away from the filling tube 40' to a position corresponding to that of the casing snubber holder 72 shown in FIG. 1. Immediately after the end portion of the artificial casing 11 has been thrown off the filling tube 40', the turret 42 performs a further angular movement through 90° in the direction of the arrow 86 so that the casing snubber holder 72' shown in FIG. 3 then reaches the original position of the casing snubber holder 72 shown in FIG. 3. The exhaustion of the supply of available artificial casing 11 is sensed by a photoelectric proximity switch 73, which then de-energizes the closing machine and the filling machine 44.

As soon as the casing snubber holder 72' has reached the position 84 shown in FIG. 3, the star-shaped holder 8 can perform a further step so that the carrier 10d shown in FIG. 3 reaches the position of the carrier 10a shown in FIG. 2.

As has been mentioned hereinbefore, when the artificial casing 11 has been transferred from the carrier 10a to the filling tube 40 and the star-shaped holder 8 has subsequently performed two further steps, the then empty carrier 10a can conveniently be provided by hand with a new artificial casing 11. In accordance with FIG. 2 this operation can be effected at the carriers 10b and 10c at the same time because they are outside of the tub 4.

The filling tube 40' and the filling machine 44 are now ready to fill the artificial casing 11 disposed on the filling tube 40'. This filling operation is effected in steps by means of the filling machine 44, which delivers the desired portions of the material to be packaged. The several portions of said material are separated by means of pairs of squeezing scissors 88, 90, which form in the artificial casing 11 constricted portions 92, and these constricted portions are then provided with closing clips 94. In this way, individual sausages can be formed, for instance.

At the beginning of the operation in which a new artificial casing 11 is filled, see FIG. 1, the first portion which is packaged, for instance, for the first sausage, has not exactly the desired weight because the filling tube 40' was not pressurized immediately before that operation. This is due to the fact that when the artificial casing 11 previously carried by the same filling tube 40' is pulled entirely from said filling tube 40', a certain quantity of material to be packaged usually runs out of the filling tube 40'. As a result, there is a certain deficiency of material in the filling tube 40' during the filling of the next following artificial casing 11 with the first portion of the material to be packaged and the pressure conditions are different, the filling with the first portion being effected under a lower pressure so that the metering of the portions is rendered even more inaccurate. In the previous practice this inaccuracy has been tolerated or the contents of the resulting sausage has been squeezed out and returned to the hopper of the filling machine 44.

According to the invention that disadvantage is essentially avoided by the provision of gripper tongs 98, which reach through the pairs of squeezing scissors 88, 90 and grip the leading end 112 of the artificial casing 11 and pull the latter to a small extent from the filling tube 40'. An also small quantity of material to be packaged is then ejected from the filling tube 40'. Two closing clips 94 are subsequently applied in the usual manner. The resulting first portion is severed from the succeeding sausage string between the two closing clips 94 which have been applied. That first portion may either be discarded because it comprises only a relatively small quantity or the contents of that package may be returned to the hopper of the filling machine 44. After the packaging of that first portion the desired constant conditions are obtained so that the portions which are subsequently packaged in the usual manner will have exactly the desired weight.

The provision of the gripper tongs 98 in accordance with the invention is significant in any case for the automatic sequence including the watering of the artificial casing 11, the transfer to the filling tube 40, and the packaging of portions of material discharged by the filling tube 40'. The gripper tongs 98 are also timed by the closing machine and automatically grip the leading end 112 of each new artificial casing 11 and pull it out through the pairs of squeezing scissors 88, 90.

With reference to FIG. 4, the gripper tongs generally designated 98 will now be described. They consist essentially of a pressure fluid-operated cylinder 100, which is preferably supplied with compressed air. Two tong arms 102, 102' are pivoted by pins 104, 104' to the cylinder 100 at that end thereof which faces the filling tube 40'. Respective links 106, 106' are pivoted to a piston 108 associated with the cylinder 100 so that the reciprocation of the piston 108 in response to a supply of pressure fluid to a cylinder chamber 110 of cylinder 100 causes the tong arms 102, 102' to be closed and opened. In FIG. 4, the tong arms 102, 102' are shown in an open position shortly before gripping a free end 112 of the artificial casing 11.

By means of a parallelogram swinging device 114, the gripper tongs 98 are pivoted to a column 116, which is rigidly connected by a plate 118 to the closing machine. It is apparent from the drawing that the parallelogram swinging device 114 consists of the arms 120, 122, which are pivoted at one end by pins 124 to the cylinder 100 and at the other end by pins 126 to the column 116.

A pressure fluid-operated cylinder 128 is pivoted by a pin 130 to the plate 118, to which a pressure fluid-operated cylinder 132 is rigidly connected. The two cylinders 128 and 132 are preferably actuated by compressed air.

In the position shown in FIG. 4, the pistons 134 and 136 of the cylinders 128, 132 are retracted. This position is assumed by the gripper tongs 98 when the turret 42 and the filling tube 40' are in the position shown in FIG. 1. (The apparatus shown in FIG. 1 is continued by the apparatus shown in FIG. 4.) In this position the pairs of squeezing scissors 88, 90 are opened to such an extent that the gripper tongs 98 can be moved to the illustrated position adjacent to the casing snubber 58', which has been swung in onto the filling tube 40'. In the resulting position the cylinder 100 is supplied with pressure fluid through an inlet conduit 138 so that the piston 108 moves away from the end of the filling tube 40' and the gripping tongs 98 close and thus grip and pull off the end portion 112 of the artificial casing 11. As soon as the gripper tongs 98 have closed, pressure fluid is supplied also to the cylinder 132 so that its piston 136 cooperates with the parallelogram swinging device 114 to move the gripper tongs 98 from the range of the pairs of squeezing scissors 88, 90 and the closing means, not shown.

When the position shown in FIG. 5 has been reached, the filling machine 44 is switched to the discharge of a small portion, with which the artificial casing 11 is then filled, whereafter the closing machine is started. A squeezing and closing operation is then performed, in which the pairs of squeezing scissors 88, 90 are moved apart, closing clips 94 are applied, and the constricted portion 92 is severed.

Before the sausage containing the small portion which does not have the desired weight is formed, the piston 134 of the cylinder 128 causes the gripping tongs 98 to be pivotally moved from the region into which the material to be packaged is discharged from the filling tube 40' and in which said material is forwarded; see FIG. 6. The gripper tongs 98 are opened and the small sausage still held by said tongs at said time is dropped, for instance, onto a chute, not shown.

The closing machine is then switched to the packaging of normal portions because the conditions in the filling tube 40' are now constant.

It is apparent from FIG. 1 that the artificial casings 11 are watered on their inside and outside surfaces in the tub 4.

It will be appreciated that the instant specification and examples are set forth by way of illustration and not limitation, and that various modifications and changes may be made without departing from the spirit and scope of the present invention.

I claim:

1. A process for applying an artificial casing to a filling tube of a sausage-filling machine, comprising placing said casing on a carrier in gathered bellows-like form, retaining said casing in such gathered form on said carrier, immersing said carrier and casing in an aqueous fluid thereby to treat said casing, withdrawing said carrier and its casing from the fluid, and transferring said treated casing from said carrier to said tube while maintaining the casing in gathered condition.

2. A process according to claim 1, wherein a plurality of carriers are included and they are sequentially provided with casings, the casing being transferred from one carrier to the filling tube while another carrier and its casing are undergoing treatment.

3. A process according to claim 1, including the further step of securing the gathered casing on the filling tube after the transfer until filling of the casing commences.

4. A process according to claim 1, wherein transfer of a treated casing from its carrier to a filling tube is effected in synchronism with completion of a sausage-filling operation on a casing which has previously gone through the process.

5. An apparatus comprising in combination a sausage-filling machine having at least one filling tube and a casing treating machine, the treating machine comprising a tank for holding a treating fluid, means for supplying treating fluid to said tank and for removing treating fluid therefrom, at least one carrier onto which a casing can be gathered in bellows-like form outside said treating fluid, means for immersing the carrier with the casing into treating fluid in said tank and then for removing the carrier and casing from the treating fluid, and means for transferring the treated casing from said carrier to said filling tube.

6. An apparatus according to claim 5, wherein a plurality of carriers are provided, the immersing and removing means including a holder onto which one end of each carrier is mounted, and means for rotating said holder so as successively to immerse and then remove the carriers and casings from treating fluid in the tank.

7. An apparatus according to claim 6, wherein the holder is star shaped and rotatable about an axis parallel to the axes of the carriers, the transfer means including a pusher displaceable in longitudinal direction of the carriers, said pusher operating when a carrier is in alignment with a filling tube.

8. An apparatus according to claim 5, including first resilient means operatively connected with said carrier for holding a gathered casing onto said carrier during immersion and removal.

9. An apparatus according to claim 6, including a further tube carried on said holder and of a diameter insufficient to contact directly a gathered casing on a carrier on said holder, said further tube being coaxially with the axis of rotation of said holder.

10. An apparatus according to claim 9, including second resilient means on said further tube, said second resilient means additionally serving to retain a casing in gathered condition on a carrier during immersion and removal.

11. An apparatus according to claim 5, including third resilient means for holding the gathered casing on the filling tube after transfer from a carrier.

12. An apparatus according to claim 5, including a pivotally mounted casing snubber in operative position snubbing the downstream end of a casing on the filling tube, and means for pivoting said snubber to inoperative position where it is out of the path of operation of the transfer means in transferring a gathered casing from a carrier to said filling tube.

13. An apparatus according to claim 12, said sausage-filling machine including a rotatable turret carrying a plurality of filling tubes, each filling tube being provided with a respective snubber rotating therewith upon rotation of said turret.

14. An apparatus according to claim 6, wherein said means for rotating said holder operates intermittently so that each carrier remains statically in immersed position for a predetermined length of time.

15. An apparatus according to claim 5, said treating machine including a pump for circulating treating fluid in said tank, a filter for removing solids from the circulating treating fluid undergoing pumping, means for supplying treating fluid to said tank, means for discontinuing supply of treating fluid when it reaches a predetermined height in said tank, and means for heating the treating fluid in said tank to a predetermined temperature.

16. An apparatus according to claim 5, including means for gripping and pulling forwardly the downstream end of the gathered casing on the filling tube after transfer of the casing from the carrier to the filling tube immediately prior to the initiation of a filling operation.

17. An apparatus according to claim 16, including a parallelogram swinging mechansim actuating said gripping and pulling means, said mechanism being disposed so that upon swinging said parallelogram from a first position where said gripping means is operative to a second position where inoperative the gripping means is outside the normal line of advance of filled casings coming off the filling tube.

18. An apparatus according to claim 17, including piston and cylinder means operatively connected with said parallelogram swinging mechanism to move the latter between said first and second positions, said piston and cylinder means being operatively connected to and controlled by the filling machine.

* * * * *